Sept. 30, 1952   E. A. ARP   2,612,064
MACHINE FOR BORING CONNECTING RODS
Filed Dec. 6, 1948   8 Sheets-Sheet 1

INVENTOR
EWALD A. ARP
BY G. H. Braddock
ATTORNEY

Sept. 30, 1952   E. A. ARP   2,612,064
MACHINE FOR BORING CONNECTING RODS
Filed Dec. 6, 1948   8 Sheets-Sheet 2
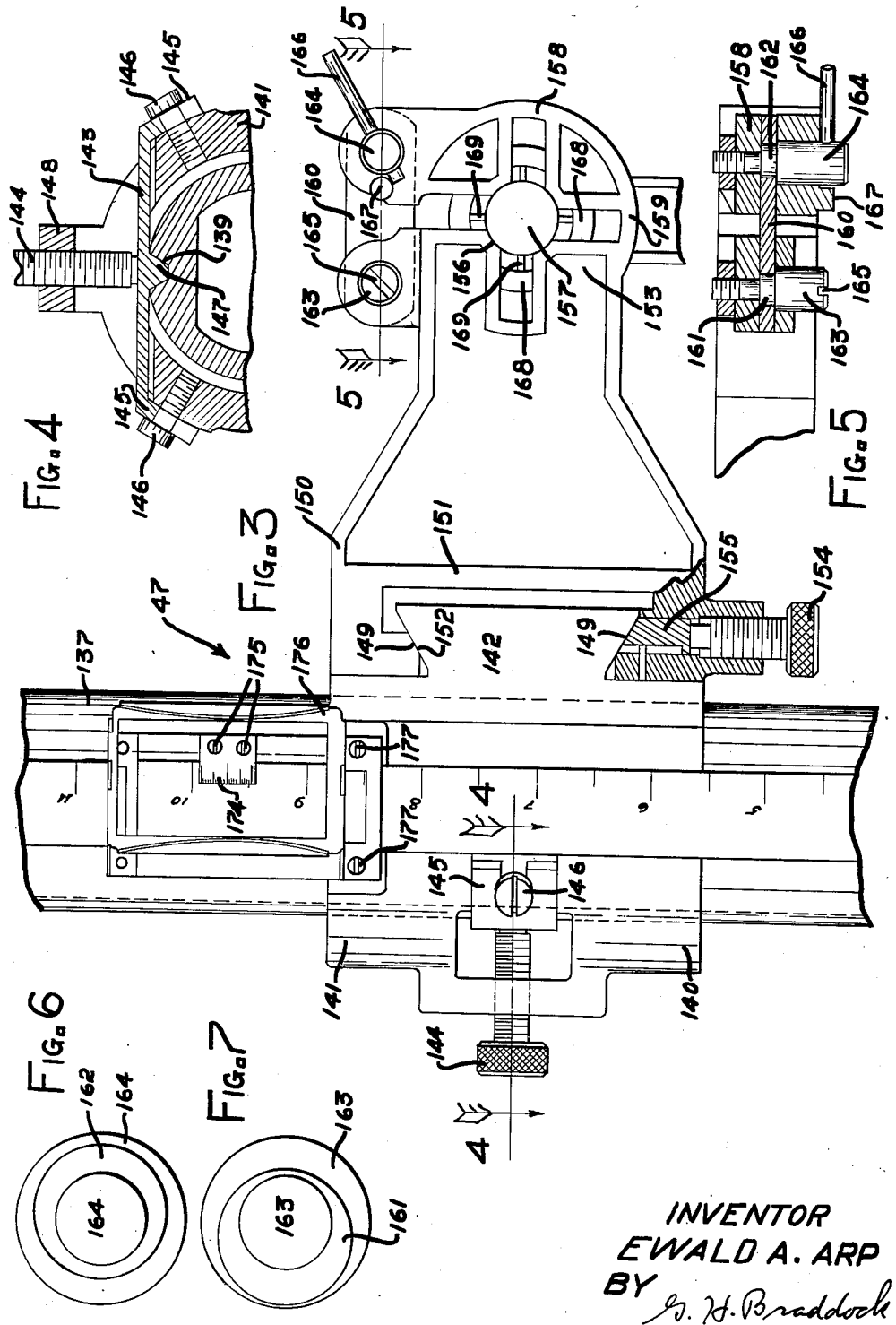
INVENTOR
EWALD A. ARP
BY G. H. Braddock
ATTORNEY

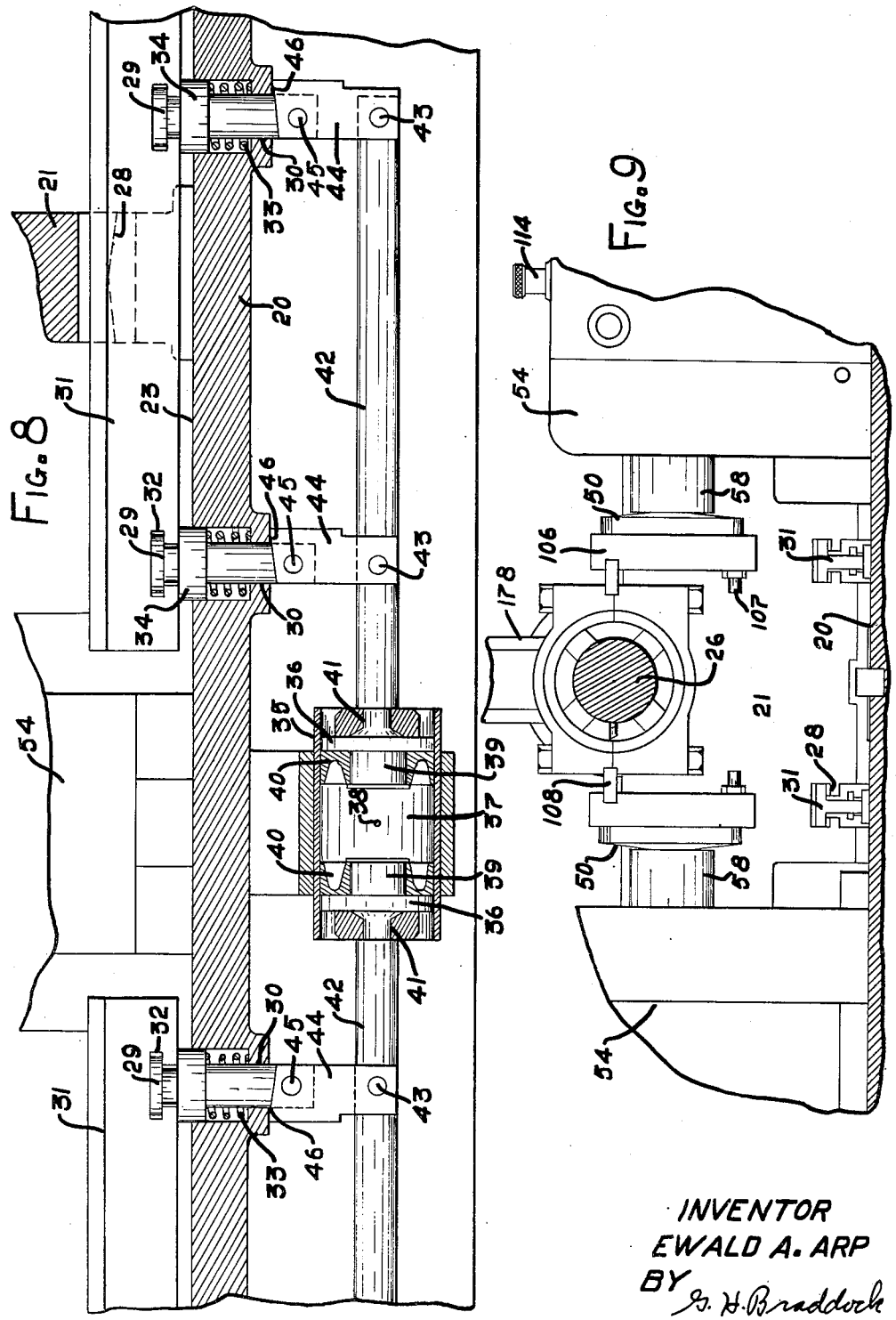

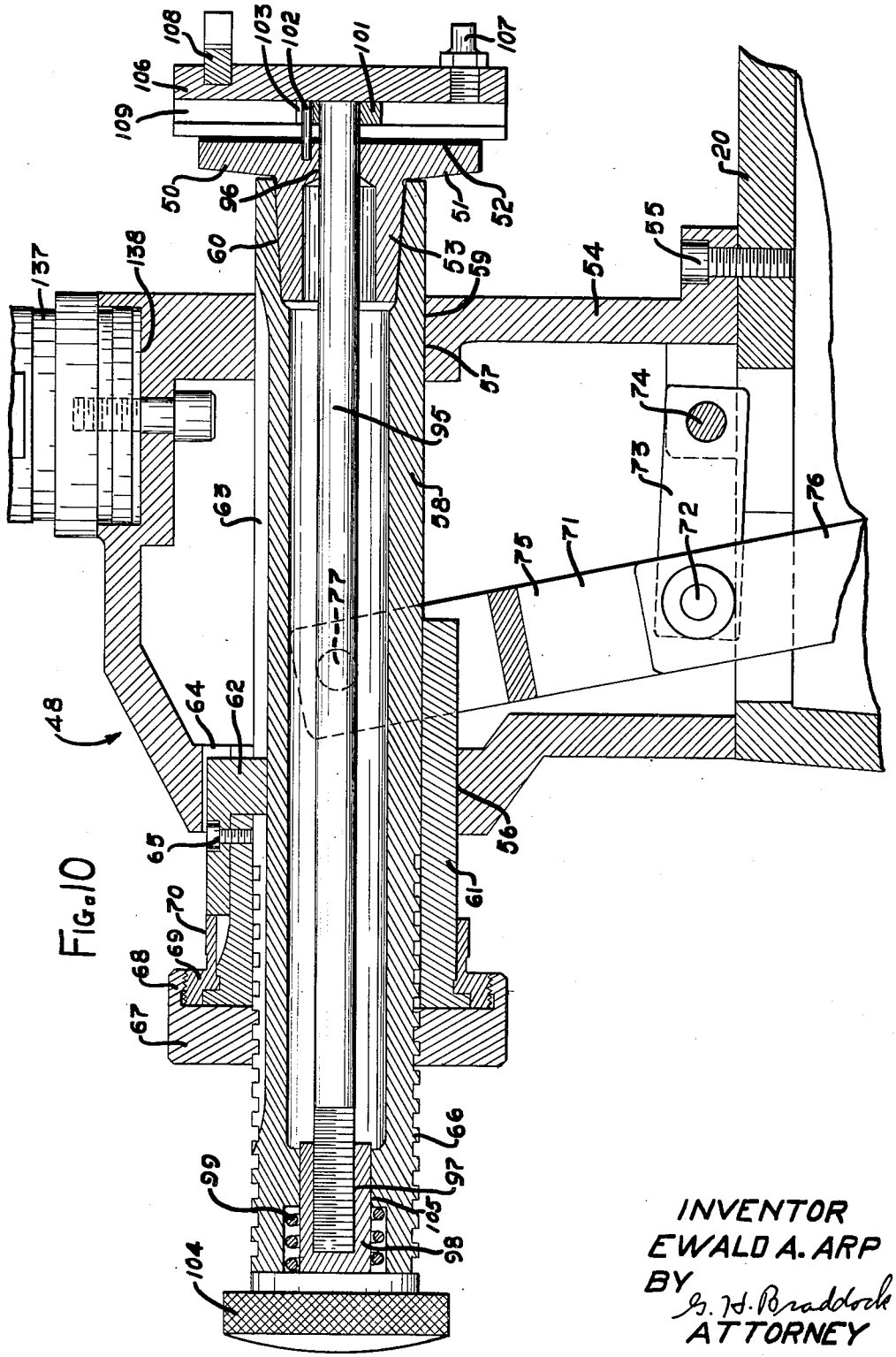

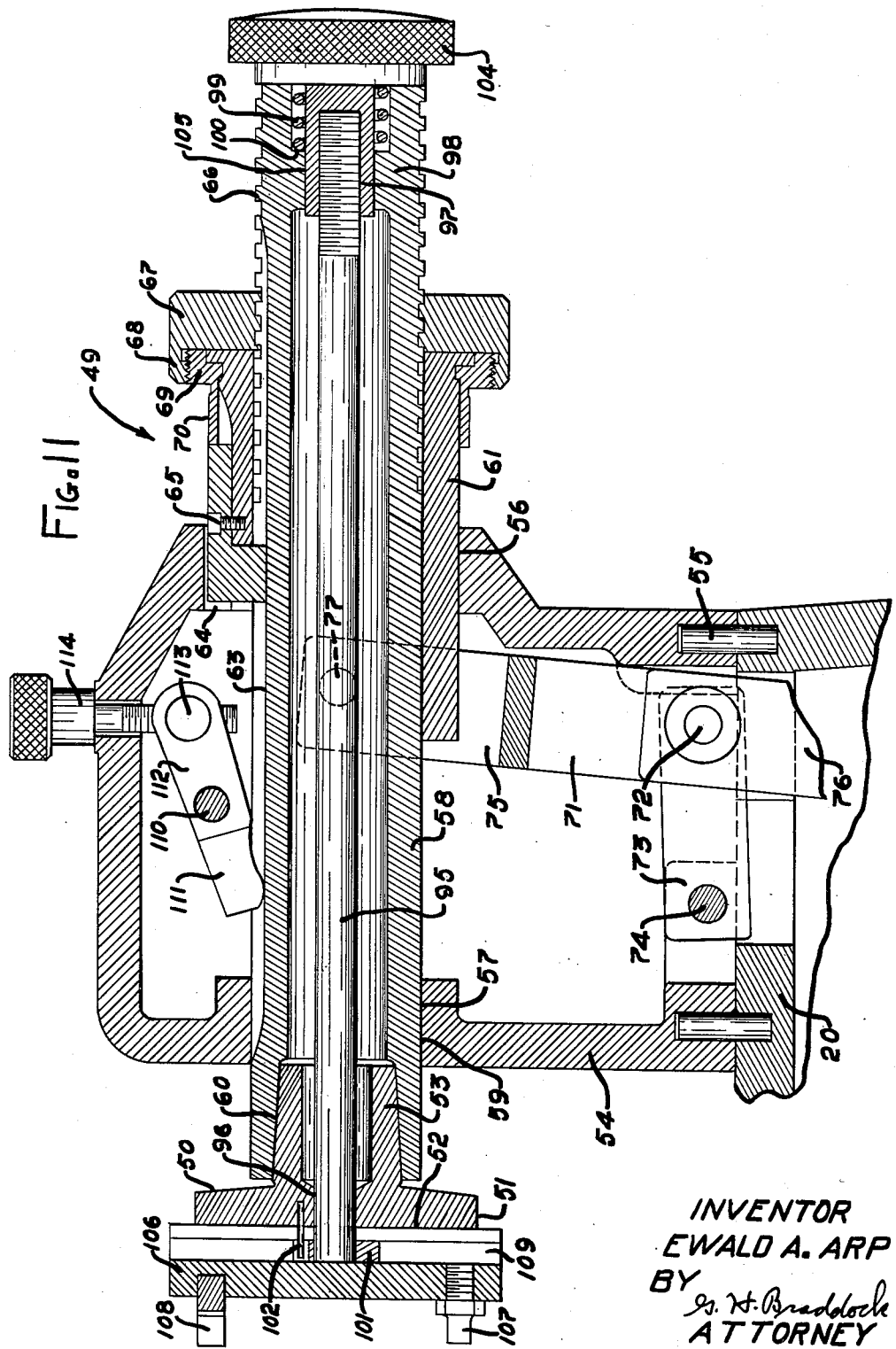

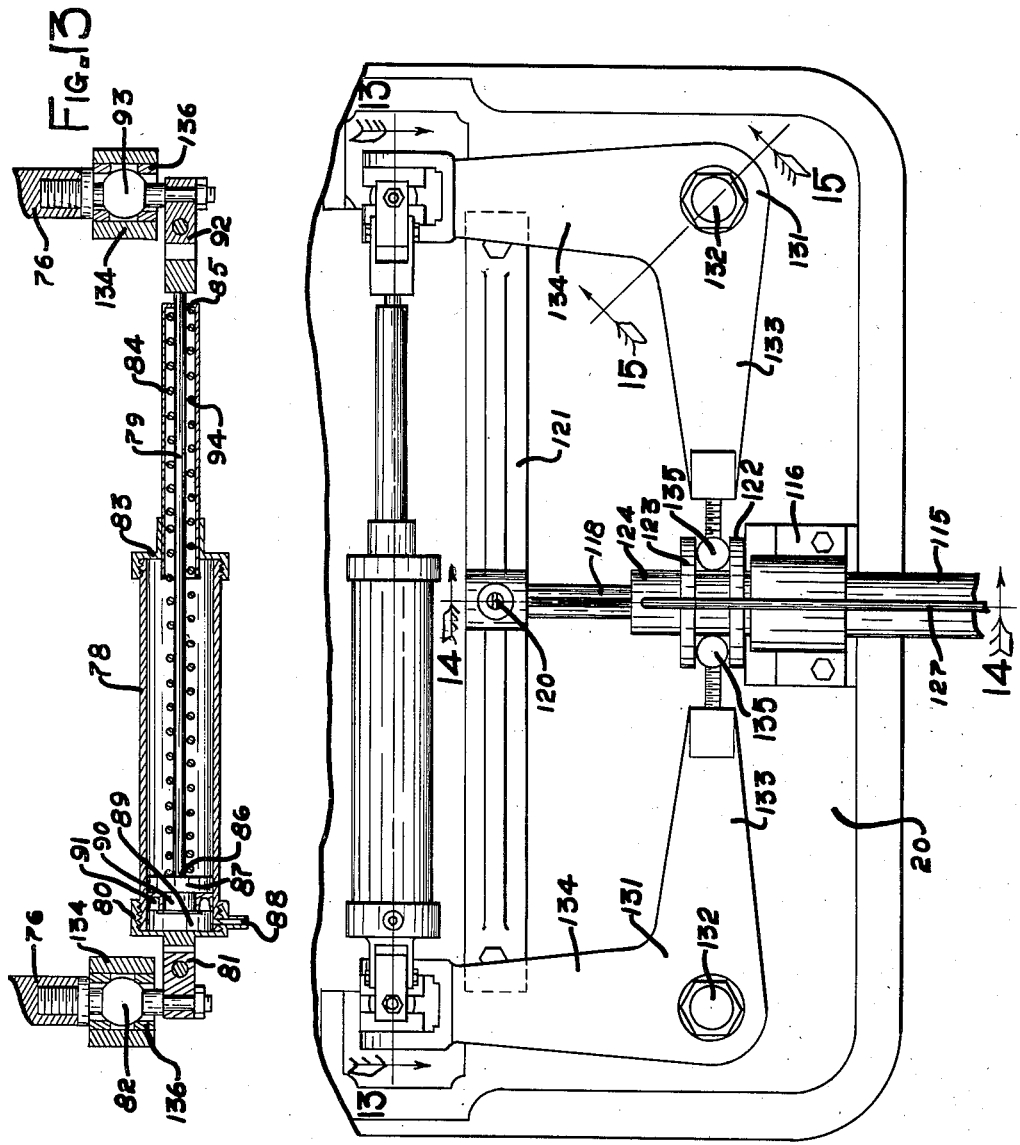

Sept. 30, 1952  E. A. ARP  2,612,064
MACHINE FOR BORING CONNECTING RODS
Filed Dec. 6, 1948  8 Sheets-Sheet 7
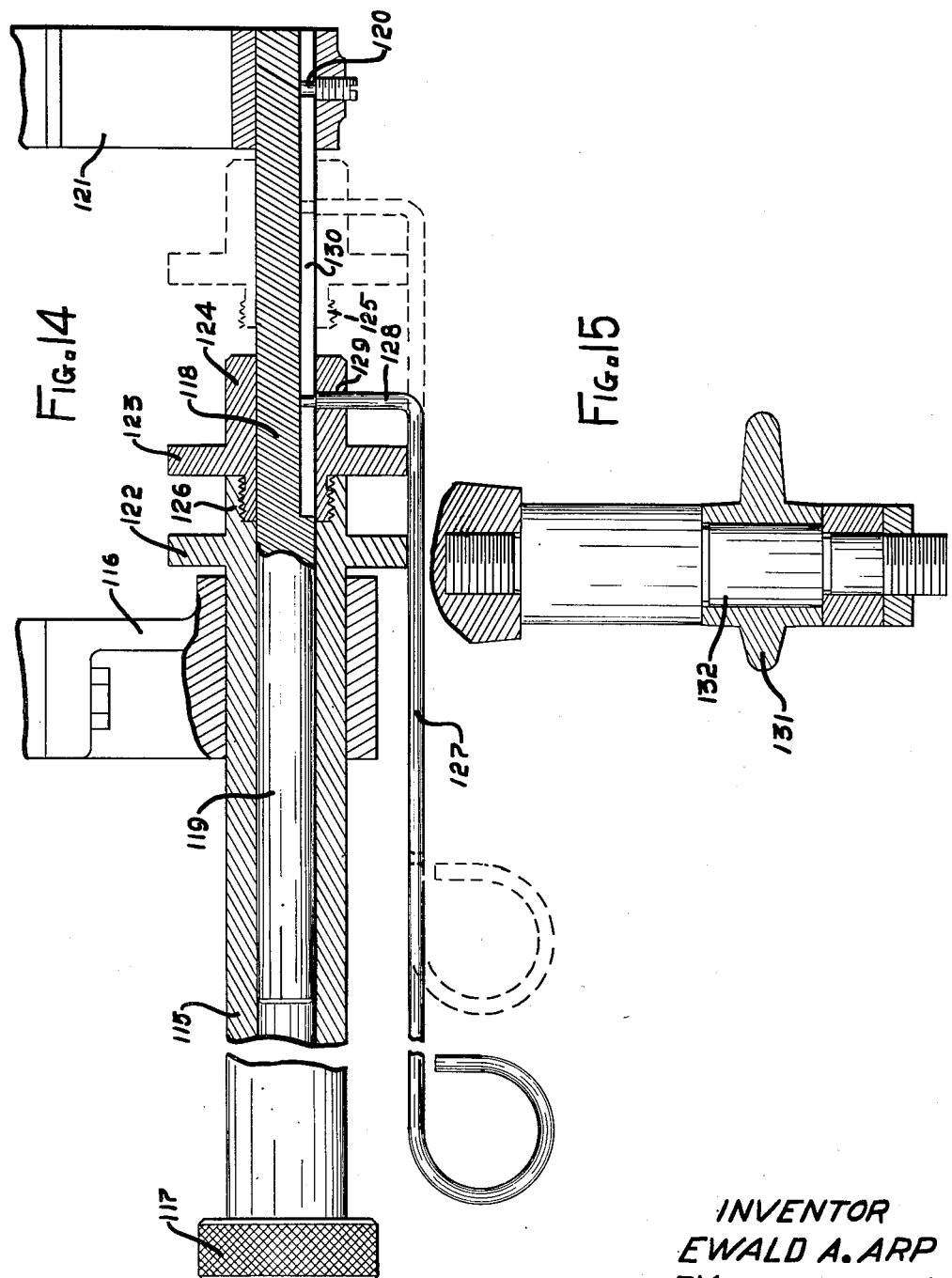
INVENTOR
EWALD A. ARP
BY G. H. Braddock
ATTORNEY Sept. 30, 1952          E. A. ARP          2,612,064

MACHINE FOR BORING CONNECTING RODS

Filed Dec. 6, 1948          8 Sheets-Sheet 8

INVENTOR.
EWALD A. ARP
BY
*G. H. Braddock*
ATTORNEY

Patented Sept. 30, 1952

2,612,064

UNITED STATES PATENT OFFICE 2,612,064

MACHINE FOR BORING CONNECTING RODS

Ewald A. Arp, Minneapolis, Minn., assignor to Tobin-Arp Manufacturing Company, Minneapolis, Minn., a corporation of Minnesota Application December 6, 1948, Serial No. 63,691

15 Claims. (Cl. 77—3)

This invention has relation to a machine which has been devised to be especially useful for boring the bearings of connecting rods for crank shafts and wrist pins.

An object of the invention is to provide a machine for boring bearings which will be of novel and improved construction and designed to perform its intended service in new and improved manner.

A further object is to provide a bearing boring machine wherein will be incorporated various desirable and improved features and characteristics novel both as individual entities of the machine and in combination with each other.

A further object is to provide a machine of the present character which will incorporate a novel and improved construction and arrangement for centering and alining with respect to each other bearings of articles, such as connecting rods, to be bored and a boring bar with appropriate tool for operating on said bearings.

And a further object is to provide in the machine adjustable units for supporting and clamping articles bearings of which are to be bored which will be of simple, practical, efficient, new and improved construction.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible as long as within the spirit of the invention and the scope of the claims which follow.

In the accompanying drawings forming a part of this specification:

Fig. 3 is an enlarged fragmentary side elevational view detailing features of the machine;

Fig. 4 is a detail sectional view, taken on line 4—4 in Fig. 3;

Fig. 5 is a detail sectional view, taken on line 5—5 in Fig. 3;

Fig. 6 is an enlarged elevational view of a first camming element which the machine employs;

Fig. 7 is an enlarged elevational view of a second camming element of the machine;

Fig. 8 is an enlarged vertical sectional view, taken on line 8—8 in Fig. 1;

Fig. 9 is an enlarged vertical sectional view, taken on line 9—9 in Fig. 1;

Fig. 10 is an enlarged vertical sectional view, taken on line 10—10 in Fig. 1;

Fig. 11 is an enlarged vertical sectional view, taken on line 11—11 in Fig. 1;

Fig. 12 is an enlarged fragmentary bottom plan view detailing features of the machine;

Fig. 13 is a detail sectional view, taken on line 13—13 in Fig. 12;

Fig. 14 is an enlarged sectional view, taken on line 14—14 in Fig. 12;

Fig. 15 is an enlarged sectional view, taken on line 15—15 in Fig. 12, and

A frame 20 of the machine is constituted as a rectilinear slab of rigid material, and can be supported in any suitable and convenient manner, as, for example, a part of a table, desirably so that the rectilinear slab will be horizontally disposed.

Figure 1:
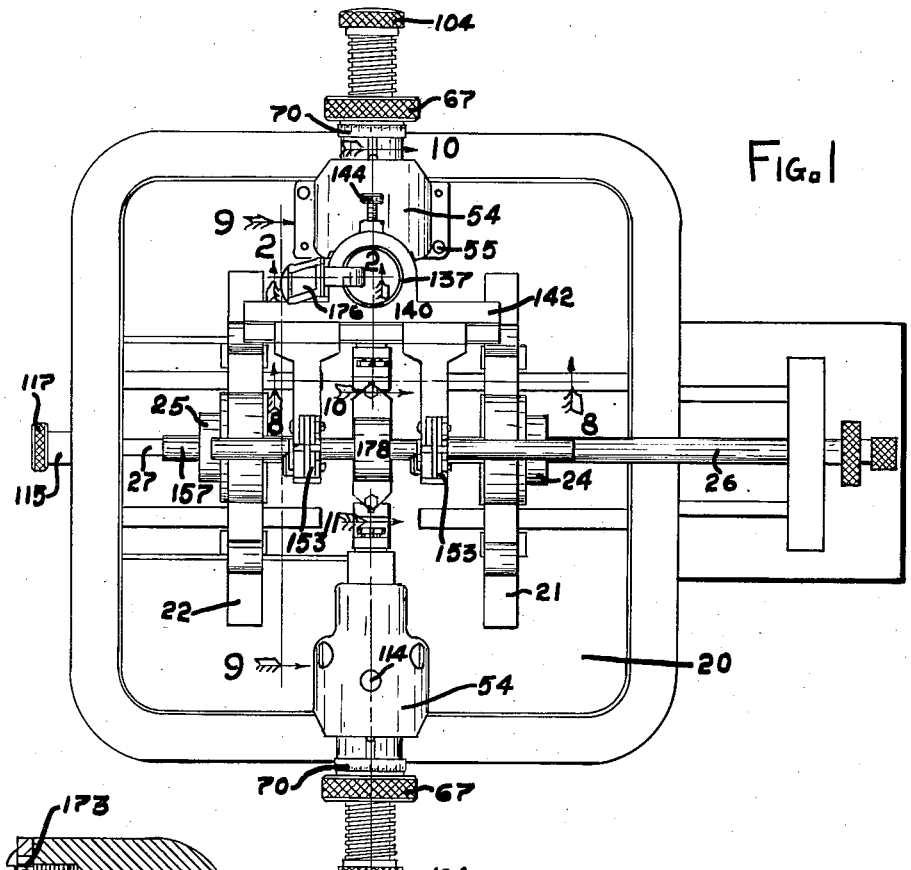
Fig. 1 is a top plan view of a machine made according to the invention.
Figure 2:
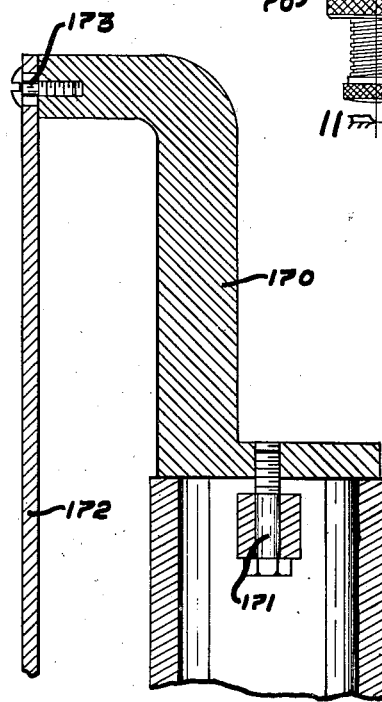
Fig. 2 is a detail sectional view, taken on line 2—2 in Fig. 1.
Figure 16:
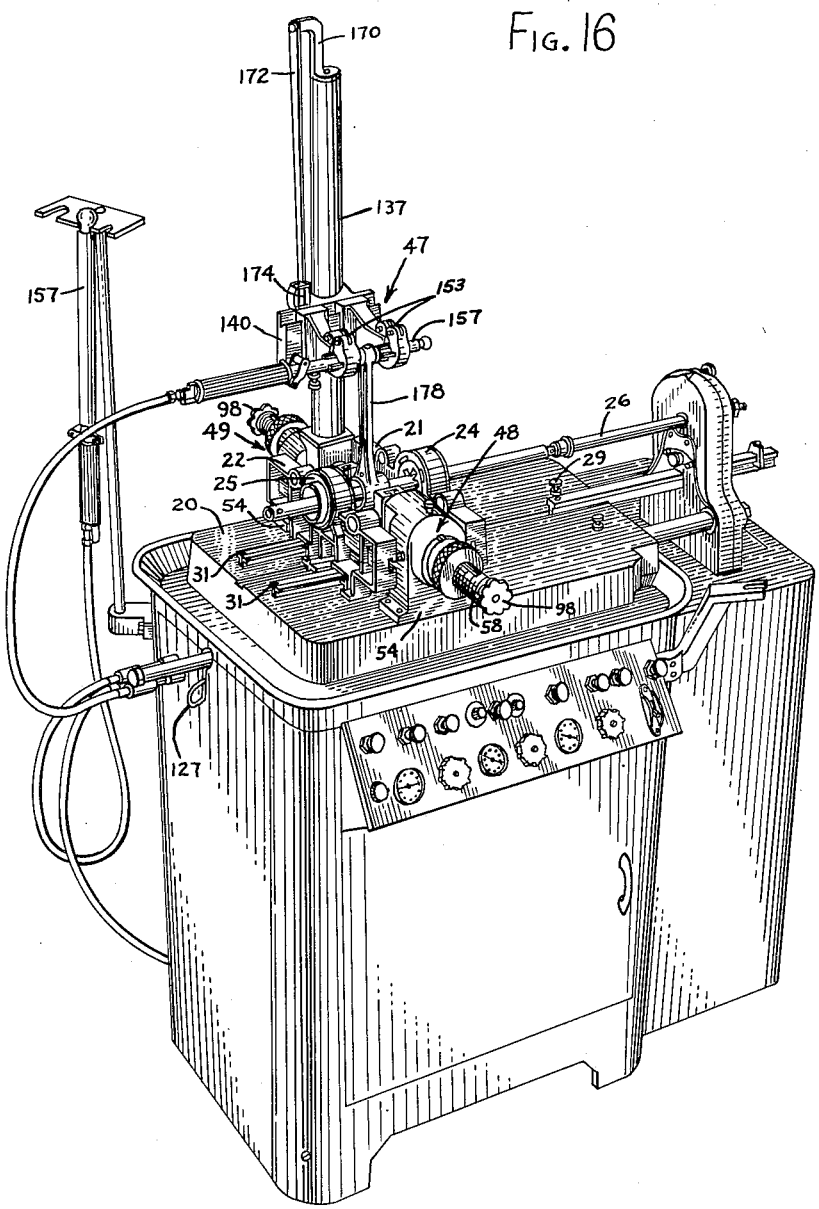
Fig. 16 is a perspective view of the machine.

Spaced apart, parallel boring bar supporting units, indicated 21 and 22, respectively, are situated upon the flat upper surface 23 of the frame 20 for slidably adjustable movement in direction toward and away from each other, and said supporting units 21 and 22 include self alining bearings, represented 24 and 25, respectively, which can be of construction as disclosed in my pending application Serial No. 44,442, for Self Alining Bearing, filed August 16, 1948, adapted to be situated in alined relation in a single, desirably horizontal, plane to be capable of selectively receiving a boring bar with cutting tool 26, as in Fig. 1, or a locating rod or mandrel (not shown). The supporting units 21 and 22 are keyed to the frame 20, as at 27, for slight rocking movement in a horizontal plane.

The boring bar supporting units 21 and 22 may be of duplicate construction. Each is constituted as an elongated rectilinear member disposed in perpendicular relation to the frame 20, as well as in perpendicular relation to a locating rod or mandrel, or to a boring bar, when situated in the self alining bearings 24 and 25. A flat lower surface of each boring bar supporting unit rests upon the flat upper surface 23 of said frame 20 for slidable movement thereover, and lower portions of the boring bar supporting units are cut away to provide spaced apart slots, contiguous with the flat lower surfaces of the supporting units and parallel to a locating rod or mandrel or to a boring bar when in said self alining bearings 24 and 25, including upwardly facing shoulders 28 for a purpose to be made plain.

The boring bar supporting units 21 and 22 are adapted to be locked down against the flat upper surface 23 of the frame 20 through the instrumentality of vertically disposed locking elements 29 slidably mounted, as at 30, in said frame and T-bars 31 assembled with said supporting units and locking elements. Upper portions of the T-bars 31 are engaged against the upwardly facing shoulders 28 and lower portions of said T-bars include transverse T-slots 32. The upper end portion of each locking element 29 is disposed above the flat upper surface 23 of the frame 20 in a T-slot 32, and a compression coil spring 33, upon each locking element 29 between a collar 34 thereon and a surface of said frame 20, normally urges the corresponding locking element 29 upwardly. A neck with head rigid with the upper end of each locking element 29 lies in a corresponding T-slot 32, and the compression coil springs 33 normally retain the locking elements 29 in position to permit the supporting units to be released from the flat upper surface 23 of the frame 20.

Each of horizontal cylinders 35, beneath the frame 20 and rigid therewith, slidably supports spaced apart pistons 36, 36 in its opposite end portions. A space within each horizontal cylinder 35, between the pistons 36, 36, is denoted 37, and a port leading to each space 37 is indicated 38. Each piston 36 suports a neck 39, and packing surrounding the neck and engaged against the body of the corresponding piston, as well as against the interior surface of the corresponding horizontal cylinder 35, is represented 40. Fluid under pressure, applied in a manner to be set forth, within the spaces 37 of the cylinders 35 is adapted to cause the pistons 36, 36 to be forcibly moved apart, and said pistons will be free for movement toward each other upon relief of the fluid under pressure.

The outer ends of the pistons 36, 36 in each cylinder 35 are engaged against parts 41 secured to connecting rods 42 which in turn are pivotally connected, as at 43, to actuator links 44 for the vertically disposed locking elements 29. Each actuator link 44 is pivotally connected, as at 45, to a corresponding locking element 29, and includes an upper oblique surface 46 engaged against a lower surface of the frame 20. The actuator links 44 include slots in their upper end portions in which the lower end portions of the locking elements 29 are situated, and the construction and arrangement are such that the pistons 36, 36 will cause the connecting rods 42, 42 to be moved apart with movement apart of said pistons in response to application of fluid under pressure to the spaces 37 of the cylinders 35, thus to cause the actuator links 44 to be rocked on their pivotal connections 45 about their oblique surfaces 46 as axes in such manner as to cause the locking elements 29 to be forcibly moved downwardly, against resilient action of the compression coil springs 33, and the heads upon said locking elements to be grasped against the corresponding T-bar 31 and forcibly move it downwardly. The construction and arrangement also are such that the T-bars 31 will grasp the upwardly facing shoulders 28 upon the supporting units 21 and 22 when said T-bars are forcibly moved downwardly to cause said supporting units to be rigidly secured upon the frame 20. The compression coil springs 33 will react upon relief of pressure in the cylinders 35 to cause the locking elements 29 to be moved upwardly, the actuator links 44 to be swung interiorly and the connecting rods 42 to be moved toward each other. Upward movement of said locking elements will cause the T-bars 31 to be released and to in turn release the supporting units.

The machine incorporates adjustable units for supporting and clamping articles bearings of which are to be bored, an adjustable article supporting unit of said machine being represented generally at 47, and adjustable article clamping units of the machine being indicated generally at 48 and 49, respectively.

Each of the clamping units 48, 49 includes a clamping member 50. Said clamping members 50 are in parallel relation to each other between and in perpendicular relation to the boring bar supporting units 21 and 22, and each clamping member is constituted as a hollow element including a head 51 having a flat interior surface 52 and a conical body 53 integral or rigid with said head and disposed exteriorly thereof and in perpendicular relation thereto. The flat interior surfaces 52 of the heads 51 are in parallel relation to each other, as well as in perpendicular relation to the supporting units 21 and 22 and the frame 20.

Each clamping member 50 is supported upon the frame 20 through the instrumentality of mounting brackets 54, secured upon said frame as at 55, and elements assembled with the clamping members and said mounting brackets.

The mounting brackets 54 are in spaced, alined relation with each other and with the heads 51, and each mounting bracket is constituted as a hollow body providing an exterior relatively large guideway 56 and an interior comparatively small guideway 57. The construction and arrangement are such that the guideways 56 and 57 of the different mounting brackets 54 are in alined relation with each other in a plane parallel to the planes of the supporting units 21 and 22, as well as in a plane parallel to the frame 20.

Each of the adjustable clamping units 48, 49 includes a hollow pushrod 58 having an interior end portion thereof slidably mounted, as at 59, in the guideway 57 of the corresponding mounting bracket 54, and the conical body 53 of each clamping member 50 is rigidly secured, as at 60, in the interior end of the corresponding pushrod 58 in such manner that the clamping members and pushrods are in alined relation. An exterior end portion of each hollow pushrod 58 is slidably mounted in a tubular element 61 itself slidably mounted in the corresponding guideway 56, and a key 62 in a longitudinal slot 63 in each hollow pushrod 58 and in a radial slot 64 in the corresponding mounting bracket 54, as well as secured, as at 65, to the corresponding tubular element 61, prevents rotative movement of the hollow pushrod 58 and tubular element 61 of each clamping unit 48, 49 relative to the corresponding mounting bracket 54 and also prevents relative turning movement of the hollow pushrod and tubular element of each clamping unit. At the same time, the hollow pushrod and tubular element of each clamping unit are assembled together in such manner as to permit their relative longitudinal movement, and, too, the tubular element 61 of each clamping unit is supported in the corresponding guideway 56 for inward and outward sliding movement, together with the corresponding hollow pushrod 58 as a unit.

The outer end portion of each hollow pushrod 58 includes an external thread 66, and an adjusting nut upon the external thread of each hollow pushrod is designated 67. A flange portion 68 upon each adjusting nut 67 includes an internal thread secured upon an external thread of an annular member 69 rotatably supported upon an exterior end portion of the corresponding tubular element 61 and fixed against movement longitudinally of said tubular element, and, desirably, an external surface 70 of each annular member 69 will be calibrated. The hollow pushrod 58 and tubular element 61 of each clamping unit are capable of relative longitudinal adjustment in response to rotational adjustment of the corresponding adjusting nut 67, and by relative longitudinal adjustment of the pushrods and tubular elements of the different clamping units, the clamping members 50 can be initially set at any distance apart which may be predeterminedly selected. The calibrations upon the external surfaces 70 can be employed in connection with pointers to indicate the adjusted positions of said clamping members. It will be apparent that with rotative adjustment of the adjusting nuts 67 in one direction the hollow pushrods 58 will be moved inwardly of the tubular elements 61 and with rotative adjustment of said adjusting nuts in opposite direction said hollow pushrods will be moved outwardly of said tubular elements.

Each adjustable clamping unit includes an operating lever 71, and said operating levers are disposed at opposite sides of the frame 20 within the mounting brackets 54. Intermediate portions of the operating levers 71 are pivotally mounted, as at 72, upon links 73, themselves pivoted on the mounting brackets, as at 74, for swinging movement of the operating levers in a vertical plane parallel with the supporting units 21 and 22 and perpendicular to the clamping members 50, 50, upper arms 75 of said operating levers extend upwardly from the pivotal supports 72, and lower arms 76 of the operating levers extend downwardly from said pivotal supports. The upper end portions of the upper arms 75 are pivotally secured, as at 77, to the tubular elements 61, and the lower ends of the lower arms 76 are adapted to be forcibly moved apart, in response to application of fluid under pressure, to cause the clamping members 50 to be forcibly moved toward each other, and moved away from each other, upon relief of pressure, to cause the clamping members to be moved apart.

Mechanism for forcibly moving the lower arms 76, 76 of the operating levers 71 apart includes a horizontal cylinder 78 below the frame 20 and pivotally connected with the lower end of one of the lower arms 76, and a horizontal connecting rod 79 alined with the horizontal cylinder 78 and pivotally connected with the lower end of the other of said lower arms 76. More explicitly stated, the cylinder 78 is closed at its outer end by a cap member 80 supporting spaced apart ears to which the lower end of the lower arm 76 at the same side of the frame 20 is pivotally connected through the medium of a link 81 and a ball joint 82, and said cylinder 78 is closed at its inner end by a cap member 83 in which a sleeve 84 is rigidly supported. Said sleeve 84 extends outwardly from the cap member 83 in spaced surrounding relation to the connecting rod 79, and the outer end of the sleeve is closed by a head 85 through which said connecting rod snugly passes and is slidably arranged. One end portion of the connecting rod 79 is rigidly secured, as at 86, to a piston 87 slidably arranged in the cylinder 78, and a port 88 contiguous with a space 89 of said cylinder 78 at the side of the piston 87 opposite said connecting rod 79 is for application of fluid under pressure to said space. The piston 87 supports a neck 90, and packing surrounding the neck and engaged against the body of the piston, as well as against the interior surface of the cylinder 78, is indicated 91. The other end portion of the connecting rod 79 is pivotally connected to the lower end of the lower arm 76 at the corresponding side of the frame 20 through the medium of a link 92 and a ball joint 93. A compression coil spring 94, on the connecting rod 79 and in the cylinder 78 and the sleeve 84, has one of its ends engaged against the piston 87 and its other end engaged against the head 85 normally to urge said connecting rod inwardly of said cylinder and sleeve thus to urge the lower arms 76, 76 of the operating levers 71, 71 toward and the upper arms 75, 75 of said operating levers away from each other. It will be apparent that fluid under pressure applied to the space 89 of the cylinder 78 will cause the piston 87 and the connecting rod 79 to be moved outwardly of said cylinder thus to cause the lower arms 76, 76 of the operating levers 71, 71 to be moved away from each other and the upper arms 75, 75 of said operating levers be moved toward each other, and that the compression coil spring 94 will cause said piston and connecting rod to be moved inwardly of the cylinder upon relief of pressure thus to cause said lower arms 76, 76 to be moved toward each other and said upper arms 75, 75 to be moved away from each other.

The hollow pushrod 58 and clamping member 50 of each clamping unit slidably support a connector shaft 95. The interior end portion of each connector shaft 95 is slidably mounted, as at 96, in the head 51 of the clamping member 50 of the corresponding clamping unit and the exterior end portion of each connector shaft is adjustably threaded, as at 97, in the shank of an adjuster nut 98 upon the exterior end of the corresponding hollow pushrod 58 slidably mounted, as at 105, in the corresponding hollow pushrod 58. A compression coil spring 99 in the exterior end portion of each hollow pushrod, between an annular shoulder 100 of the hollow pushrod and the head of the adjacent adjuster nut 98, normally urges a supporting head 101 upon the inner end of the corresponding connector shaft, at the interior side of the flat interior surface 52 of the corresponding clamping member 50, toward the corresponding head 51, and a pin 102 in each head 51 and slidably disposed in a radial slot 103 in the adjacent and corresponding supporting head precludes turning movement of the supporting head, and hence of the corresponding connector shaft, in the corresponding hollow pushrod. The construction and arrangement are such that the connector shafts 95 can be turned into the shanks of the adjuster nuts 98 to cause the supporting heads 101 to be engaged against the flat interior surfaces 52 while the heads of said adjuster nuts are engaged against the exterior ends of the hollow pushrods 58, or said connector shafts can be situated in said shanks to permit the compression coil springs 99 to urge said supporting heads against the flat interior surfaces 52 and said heads of the adjuster nuts in spaced relation to said exterior ends of said hollow pushrods outwardly thereof so that the supporting heads can become spaced from the flat interior surfaces 52 inwardly thereof in response to inward sliding movement of the connector shafts 95 adapted to be accomplished in response to manual movement inwardly of said adjuster nuts 99, desirably the adjuster nuts 99 are knurled, as at 104.

Each supporting head 101 is adapted to removably receive an adapter 106, and each adapter may support one or more adapter elements for a purpose to be set forth. As shown each adapter 106 supports a lower adapter element 107 constituted as a holder button and an upper adapter element 108 constituted as a V-block. The adapter elements 107 and 108 are at the interior sides of the adapters 106, and the adapter elements 107, 107 and 108, 108, respectively, of the different clamping units are in a single plane and in alinement in direction longitudinally of the hollow pushrods 58. As shown, each adapter 106 includes a T-slot 109 in which the corresponding supporting head 101 is adapted to be slidably, removably situated. The connector shafts 95 will be pushed inwardly against resilient action of the compression coil springs 99 to cause the supporting heads 101 to be spaced from the flat interior surfaces 52 when it is desired to assemble the adapters 106 with the supporting heads 101, and upon release of said connector shafts, said compression coil springs will react to cause said adapters 106, after assembled with said supporting heads, to be pressingly engaged against said flat interior surfaces 52. The adapters can be loosely fitted upon the supporting heads to be capable of having slight rotative movement in a vertical plane transversely of the hollow pushrods 58, or said adapters can be caused to be grasped tightly against the flat interior surfaces 52 by turning the shanks of the adjuster nuts 98 down on the connector shafts 95.

It will be apparent that the clamping members 50 will be actuated in response to fluid under pressure applied to the space 89 in the cylinder 78 and caused to be moved inwardly. Also it will be apparent that the hollow pushrod 58 and tubular element 61 with appurtenances of each clamping unit are floatingly mounted within the guideways 56 and 57 of the corresponding mounting bracket 54 so that the clamping members 50 will be capable of having inward movement to unequal extent. That is, supposing an article a bearing of which is to be bored to be supported in the machine, in a manner to be set forth, between and at unequal distances from adapters, such as 106, upon the clamping members 50, the adapter which initially is closest to the article will first engage it under pressure of fluid in the cylinder 78 and inward movement of said adapter will be arrested until the adapter which initially was farthest from said article engages it under the same pressure of fluid. Stated otherwise, the construction and arrangement are such that an article having a bearing to be bored can be clamped in the machine between and at unequal distances from the clamping members 50, 50 and yet grasped with equal pressure applied to each of oppositely disposed surfaces of the article.

The machine incorporates means which selectively can be employed to cause one of the clamping members 50 to be retained stationary while the other clamping member is moved toward and away from the stationarily retained clamping member to effect clamping and releasing of articles having bearings to be bored in instances when this may be preferable.

As disclosed in Figs. 1 and 11, the clamping unit 49 includes a locking lever having an intermediate portion thereof rotatably supported, as at 110, upon the corresponding mounting bracket 54, a first arm 111 thereof situated in the longitudinal slot 63 of the corresponding clamping unit and a second arm 112 thereof pivotally connected to a cross pin 113 upon an external thread of a locking screw bolt 114 having its shank disposed in an opening through the corresponding mounting bracket and its head rested upon an exterior surface of said corresponding mounting bracket. The construction and arrangement are such that the locking screw bolt 114 can be turned down in the cross pin 113 to cause the second arm 112 of the locking lever to be forcibly swung upwardly and the first arm 111 of said locking lever to be forcibly swung downwardly against the corresponding hollow pushrod 58, or said locking screw bolt can be turned up in said cross pin to cause said first arm to be releasably withdrawn from said corresponding hollow pushrod. When it is desired to retain the clamping member 50 of the clamping unit 49 in stationary position, the first arm 111 of the locking lever will be forced down to exert pressure against the corresponding hollow pushrod 58 in amount sufficient to preclude the possibility of longitudinal movement of said corresponding hollow pushrod and its appurtenances in response to pressure of fluid in the horizontal cylinder 78. Instead, pressure of fluid in said horizontal cylinder will cause the hollow pushrod and its appurtenances of the clamping unit 48 to be moved inwardly twice the distance it would were the hollow pushrod of the clamping unit 49 free for inward movement.

Also the machine incorporates devices which selectively can be employed to cause the clamping members 50 to be movable inwardly and outwardly in equal degree and to equal extent to effect clamping and releasing of articles having bearings to be bored in instances when this may be desirable.

As disclosed in Figs. 1, 12, 13, 14 and 15, numeral 115 denotes a hollow control shaft situated beneath the frame 20 and mounted in a bracket 116 secured to said frame for rotational and longitudinal sliding movement. The hollow control shaft 115 is in a plane parallel to the plane of the frame 20, is perpendicular to the horizontal cylinder 78 and horizontal connecting rod 79, and is spaced at equal distance from and inwardly of the ball joints 82 and 93. A knurled knob upon the outer end of said hollow control shaft 115 is indicated 117.

A supporting shaft 118, in alined relation to the hollow control shaft 115, has one of its end portions snugly situated, as at 119, in a longitudinally extending opening in the interior end portion of said hollow control shaft 115 and its other end portion fixed, as at 120, in a bracket 121 secured to the frame 20. The hollow control shaft 115 is rotatably and slidably mounted upon the supporting shaft 118, as well as rotatably and slidably mounted in the bracket 116, and said supporting shaft is fixed against movement in the machine.

A first retaining element 122 upon and integral or rigid with an interior end portion of the hollow control shaft 115 is constituted as an annular member in perpendicular, surrounding relation to said hollow control shaft, and a second retaining element 123 upon and integral or rigid with a hub 124 slidably mounted upon the supporting shaft 118 is constituted as an annular member in perpendicular, surrounding relation to said hub and supporting shaft.

The hub 124 includes an externally threaded portion 125 at the side thereof adjacent the hollow control shaft 115 adapted to be either engaged in an internal thread 126 at the interior end of said hollow control shaft to cause the first and second retaining elements to be secured in fixed and adjacent relation as in full lines in Fig. 14 of the drawings or removed from said internal thread to permit said hub and second retaining element to be in free and remote relation to the first retaining element as in dotted lines in said Fig. 14.

A slide hook 127, having its interior end 128 situated in a radial slot 129 in the hub 124 and in a longitudinal slot 130 in the supporting shaft 118, is for accomplishing longitudinal sliding movement of said hub, toward and away from the hollow control shaft 115, and the internal thread 126 of said hollow control shaft can be turned onto and off of the externally threaded portion 125 of the hub by rotative movement of said hollow control shaft.

Equalizing levers of the devices adapted to be employed to cause the clamping members 50 to be movable inwardly and outwardly in unison are denoted 131, 131. As disclosed the equalizing levers are of the same construction and each is of L-shape.

An intermediate portion of each equalizing lever 131 is rotatably supported, as at 132, upon and beneath and in spaced, parallel relation to the frame 20, a first arm 133 of each equalizing lever extends interiorly of the corresponding rotatable support 132, and a second arm 134 of each equalizing lever extends away from the corresponding rotatable support 132 in direction toward the ball joint, 82 or 93, as the case may be, at the corresponding side of said frame 20.

Each of the first arms 133 rigidly supports a cylindrical retaining piece 135 upon its inner end in alinement with the corresponding first arm and snugly situated between the first and second retaining elements 122 and 123 when these are supported in fixed and adjacent relation to each other as in full lines in Fig. 14, and each of the second arms 134 is bifurcated at its outer end and is pivotally connected, as at 136, to the ball joint at the corresponding side of the frame 20.

The construction and arrangement are such that the first arms 133, 133 are in alinement and the second arms 134, 134 are parallel, as disclosed in Fig. 12 of the drawings, when the ball joints 82 and 93 are retained at their closest distance together by the lower arms 76, 76 of the operating levers 71, 71 by reason of said lower arms being at their closest relation to each other. Upon application of fluid under pressure to the horizontal cylinder 78 causing the lower arms 76, 76 to be moved apart, the second arm 134 of each of the equalizing levers 131 will be swung exteriorly with the corresponding lower arm 76 as a unit thus to swing the first arms 133, 133 of said equalizing levers in direction toward said horizontal cylinder 78 and the horizontal connecting rod 79. The cylindrical retaining pieces 135, 135, upon the inner ends of said first arms 133, 133 and confined between the first and second retaining elements 122 and 123 upon the hollow control shaft 115, will cause said hollow control shaft to slide interiorly with swinging movement of said first arms interiorly, and, by reason of the fact that said cylindrical retaining pieces are confined between said first and second retaining elements, the equalizing levers 131, 131 will cause the lower arms 76, 76 to be movable outwardly, and the upper arms 75, 75 to be movable inwardly, in unison and in equal degree and to equal extent. Conversely, with movement of the lower arms 76, 76 toward each other, the equalizing levers 131, 131 will cause said lower arms to be movable inwardly, and the upper arms 75, 75 to be movable outwardly, in unison and in equal degree and to equal extent.

When the second retaining element 123 is released from the hollow control shaft 115 and situated in remote relation to the first retaining element 122 as in dotted lines in Fig. 14, the cylindrical retaining pieces 135, 135 will be free to have movement independently of each other so that the first arms 133, 133 of the equalizing levers 131, 131 will be capable of swinging interiorly and exteriorly, from and back to their positions as in Fig. 12, to the extent dictated by the length of swinging movement of the lower arms 76, 76 regardless of whether said lower arms swing through the same arc or through unequal arcs.

The adjustable article supporting unit 47 includes a vertical slide column 137 which is supported, as at 138, upon the mounting bracket 54 of the adjustable article clamping unit 48 and extends upwardly therefrom, and said vertical slide column 137 has a longitudinally extending slot 139.

A holder 140, adjustable longitudinally of the vertical slide column 137 and adapted to be secured in fixed relation thereto, is constituted as a tubular element 141 slidable along said column and a carriage 142 disposed interiorly of the column. The holder 140 is adapted to be fixed upon the slide column 137 at any elevation to which adjusted through the medium of a lock bar 143 and a lock screw 144. The lock bar 143 includes offset end portions 145 having elongated slots which receive screw bolts 146 adapted to be turned into the tubular element 141 and a transverse rib 147 at its central portion disposed in the elongated slot 139, and the lock screw 144 is situated in a protuberance 148 upon said tubular element and adapted to be turned down against a surface of the lock bar 143 directly opposite its transverse rib 147. The construction and arrangement are such that the holder 140 will be fixed upon the vertical slide column 137 against rotational and longitudinal movement when the lock screw 144 is turned down against the lock bar 143, and also such that said holder can be adjusted upwardly and downwardly along said vertical slide column when said lock screw is withdrawn from said lock bar.

The carriage 142 is constituted as an elongated member disposed at elevation above and in parallel relation to a locating rod or mandrel, or a boring bar with cutting tool, such as 26, when in the self alining bearings 24 and 25, as well as parallel to the frame 20 and in perpendicular relation to and at elevation above the hollow pushrods 58, and said carriage includes upper and lower, oblique or bevel surfaces 149.

Each of a pair of duplicate retainers 150 of the article supporting unit 47 consists of a body portion 151 including upper and lower, oblique or bevel surfaces 152 slidably mounted upon the oblique or bevel surfaces 149 of the carriage 142 and a locating rod or mandrel receiving portion 153 disposed interiorly of said carriage. The retainers 150 are adapted to be adjusted toward and away from each other by sliding movement of the body portions along the carriage, and a screw bolt 154 in each body portion and engaged against a wedge 155 therein is adapted to be turned down to cause the corresponding retainer 150 to be fixed relative to said carriage.

The locating rod or mandrel receiving portion 153 of each retainer 150 is split and provides a cylindrical engaging surface 156 for a locating rod or mandrel 157. The construction and arrangement are such that the cylindrical engaging surfaces 156 of the receiving portions 153 of the different retainers 150 are situated in alined relation and parallel to and above a locating rod or mandrel when in the self alining bearings 24 and 25, and, desirably, said cylindrical engaging surfaces can be in a vertical plane also including said self alining bearings. As disclosed, the retainers 150, 150 are situated interiorly of the boring bar supporting units 21 and 22. Approximately one-half of the cylindrical engaging surface 156 of each receiving portion 153 is constituted as an integral continuation of the corresponding body portion 151, and the other half of each cylindrical engaging surface is provided by a curvilinear member 158 flexibly connected, as at 159, to the corresponding body portion at one side only of the cylindrical engaging surface. The curvilinear member 158 of each receiving portion 153 is adjustably connected to the part of the receiving portion integral with the corresponding body portion 151 at the side of the corresponding cylindrical engaging surface 156 opposite the corresponding flexible connection 159 by a link 160 having one of its ends rotatably mounted upon a camming element 161 and its other end rotatably mounted on a camming element 162. The camming elements 161 and 162 are integral or rigid with shanks, represented 163 and 164, respectively, rotatably mounted in the part of the receiving portion constituting a continuation of the corresponding body portion 151 and the corresponding curvilinear member 158. A slot 165 in each shank 163 is for accomplishing rotative adjustment of the corresponding camming element 161, a manipulating handle 166 in each shank 164 is for rotatably actuating the corresponding camming element 162, a stop 167 in each curvilinear member 158 is for limiting the extent of rotative actuation of the corresponding camming element 162, and slots 168 in the receiving portion 153 of each retainer 150, in contiguous relation to the corresponding cylindrical engaging surface 156, are for freely receiving expanders 169 which a locating rod or mandrel, such as 157, may include. The construction and arrangement will be such that the manipulating handles 166 can be turned to position to cause the links 160 and camming elements 161 and 162 to spread the separate parts of the receiving portions 153 apart thus to render the cylindrical engaging portions 156 capable of freely receiving a locating rod or mandrel, such as 157, and also such that said manipulating handles can be turned to position to cause said links and camming elements to force said separate parts of said receiving portions toward each other thus to cause said cylindrical engaging portions to grasp a locating rod or mandrel, such as 157, when situated within the cylindrical engaging portions. Desirably, a locating rod or mandrel, such as 157, will be grasped in the cylindrical engaging portions 156, 156 under sufficient pressure to preclude its accidental longitudinal movement, and, at the same time, under insufficient pressure to prevent its rotative movement.

A scale support 170 is suitably and conveniently secured, as at 171, upon the upper end of the vertical slide column 137, and a vertical scale 172 is secured, as at 173, to said support 170 and extends downwardly in spaced parallel relation to said vertical slide column. An indicator 174 for the scale 172, cooperating therewith to provide a vernier scale, is secured, as at 175, to a slide element 176 itself secured, as at 177, to the tubular element 141 of the holder 140. By employment of a vernier scale constituted as illustrated and described, said holder 140 can be nicely adjusted relative to the vertical slide column 137 thus to set the cylindrical engaging portions 156, 156 exactly at any elevation which may be predetermined.

In the accomplishment of practical operation of the machine, the boring bar supporting units 21 and 22 will be set up on the frame 20 in spaced relation to each other a desired distance apart at opposite sides of the clamping units, and fastened down on said frame in the manner as hereinbefore set forth. Also, the holder 140 will be adjusted along the vertical slide column 137 to situate the retainers 150, 150 and their cylindrical engaging portions 156, 156 at a selected elevation, predetermined by the length of a connecting rod to be rebored, and said retainers 150, 150 will be adjusted along the carriage 142 of said holder 140 to be situated at a desired distance apart and fixed upon said carriage. As disclosed, the retainers 150, 150 are at opposite sides and above the elevation of the clamping units and spaced inwardly and above the elevation of the supporting units 21 and 22. Said clamping units and supporting units are substantially in the same horizontal plane. One end of a connecting rod, either the wrist pin end or the crank shaft end, having a bearing to be rebored, will be placed between the receiving portions 153, 153 of the retainers 150, 150 and a locating rod or mandrel, such as 157, will be inserted in and through the cylindrical engaging portions 156, 156 and the end of the connecting rod between said receiving portions, and the other end of said connecting rod, either the crank shaft end or the wrist pin end, will be placed between the supporting units 21 and 22 and a locating rod or mandrel will be inserted in and through the self alining bearings 24, 25 and the end of said connecting rod between said supporting units. Of course, the holder 140 can be adjusted along the vertical slide column 137 simultaneously with the insertion of locating rods or mandrels in the upper and lower ends of a connecting rod and in the receiving portions 153, 153 and supporting units 21, 22. As disclosed, the wrist pin end of a connecting rod 173 is fitted upon the upper locating rod or mandrel 157 and the crank shaft end is between the supporting units 21, 22. This is the set up when a crank shaft end is to be rebored. The crank shaft end is fitted upon the upper locating rod or mandrel and the wrist pin end is situated between the supporting units when a wrist pin end is to be rebored.

The clamping units will be actuated to cause adapter elements such as 107, 107 or 108, 108, upon adapters, such as 106, 106, carried by the clamping members 50, 50 to grasp oppositely disposed surfaces of the end of a connecting rod between the supporting units 24, 25 after the connecting rod has been fitted upon the upper and lower mandrels. Fluid under pressure will be applied to the space 89 of the horizontal cylinder 78 to cause the lower arms 76, 76 of the operating levers 71, 71 to be forcibly moved away from each other thus to cause the upper arms 75, 75 of said operating levers, and hence the clamping members 50, 50 to be forcibly moved toward each other. The adapter elements, such as 107, 107, or 108, 108, or adapter elements of some other construction, will engage oppositely disposed surfaces of the end of the connecting rod upon the lower locating rod or mandrel, and it will be apparent that the adapter elements and clamping members will be caused to engage the oppositely disposed surfaces of said connecting rod with equal pressure so there will be no distorting pressure applied to the lower locating rod or mandrel.

In instances when oppositely disposed surfaces of the end of a connecting rod on the lower locating rod or mandrel to be engaged by adapter elements, such as 107, 107 or 108, 108, are equally spaced from the longitudinal axis of said lower locating rod or mandrel, the cylindrical retaining pieces 135, 135 can be confined between the first and second retaining elements 122 and 123, as in Fig. 12, so that said adapter elements will move inwardly and outwardly in equal degree and to equal extent. In instances when oppositely disposed surfaces of the end of a connecting rod on the lower locating rod or mandrel to be engaged by adapter elements are unequally spaced from the longitudinal axis of said lower locating rod or mandrel, the second retaining element 123 can be released from the hollow control shaft 115 and situated as in dotted lines in Fig. 14.

When the bearings of several different connecting rods of duplicate construction are to be successively rebored, the original set up can be as hereinbefore described. Thereafter, insertion of the lower locating rod or mandrel can be dispensed with. Instead, a boring bar with cutting tool 26 can be inserted in and through the self alining bearings 24 and 25 and the end to be rebored of each connecting rod. It will be evident that a bearing to be rebored can be alined in the machine with respect to either the internal surface of the bearing or oppositely disposed surfaces of the work. In any instance when desirable, one of the clamping members 50 can be fastened against movement in the machine in the manner as hereinbefore set forth. The clamping operation will be accomplished by the workman in the manner deemed most suitable in specific instances. That is, in some cases the clamping members may be moved in unison through the instrumentality of the equalizing levers 131, 131 and their appurtenances, in other cases the clamping members may both be free for independent movement because of their release by removal of the hub 124 from the hollow control shaft 115, and in still other cases one of the clamping members may be fixed in the machine, by employment of the locking screw 114 and the locking lever, while the other clamping member is free for movement.

It will be understood that the lower locating rod or mandrel will be removed from the bearing of a connecting rod to be rebored after the connecting rod is set up in the machine, and a boring bar with appropriate cutting tool will be set up in the self alining bearings of the supporting units 21 and 22 and actuated to accomplish a boring operation upon a bearing of said connecting rod, of course while the upper end of the connecting rod is supported upon the upper locating rod or mandrel.

The cylindrical engaging portions 156, 156 will be released from the upper locating rod or mandrel and pressure of fluid in the space 89 will be relieved when a connecting rod is to be removed from the machine, and another connecting rod the bearing of which is to be rebored can be located in the machine by repetition of the operations hereinbefore described.

What is claimed is:

1. In a machine of the character described, a frame, spaced apart operating levers having intermediate portions thereof mounted upon said frame for swinging movement of first and second arms, respectively, of said operating levers toward and away from each other, hydraulically operated means for forcibly moving the second arms of said operating levers in direction away from each other thus to move the first arms of said operating levers toward each other, alined pushrods pivotally assembled with said first arms of the operating levers, bearings floatingly supporting said alined push rods for independent longitudinal movement, and spaced apart clamping members supported upon and between said pushrods in alined relation therewith and disposed between the first arms of said operating levers.

2. The combination as specified in claim 1, and means for adjusting said pushrods relative to said frame toward and away from each other.

3. The combination as specified in claim 1, tubular elements mounted on said frame for longitudinal sliding movement and in which said pushrods are mounted for longitudinal adjustment, and means for accomplishing relative longitudinal adjustment of said tubular elements and said pushrods thus to accomplish adjustment of said clamping members toward and away from each other.

4. In a machine of the character described, a frame, spaced apart operating levers having intermediate portions thereof mounted upon said frame for swinging movement of first and second arms, respectively, of said operating levers toward and away from each other, hydraulically operated means for forcibly moving the second arms of said operating levers in direction away from each other thus to move the first arms of said operating levers toward each other, alined tubular elements on said frame and pivotally assembled with said first arms of the operating levers, alined pushrods mounted in said tubular elements for longitudinal sliding adjustment, bearings floatingly supporting said alined tubular elements and pushrods for longitudinal movement, spaced apart clamping members supported upon and between said pushrods in alined relation therewith and disposed between the first arms of said operating levers, and means for accomplishing relative longitudinal adjustment of said tubular elements and pushrods thus to accomplish adjustment of said clamping members toward and away from each other.

5. The combination as specified in claim 1, and means for causing said clamping members to be movable in unison in equal degree and to equal extent.

6. The combination as specified in claim 4, and means for causing said clamping members to be movable toward and away from each other in equal degree and to equal extent.

7. The combination as specified in claim 1, and means for retaining one of said clamping members stationary.

8. The combination as specified in claim 4, and means for retaining one of said pushrods and the tubular element and the clamping member assembled therewith stationary.

9. In a machine of the character described, a frame, spaced apart operating levers having intermediate portions thereof mounted upon said frame for swinging movement of first and second arms, respectively, of said operating levers toward and away from each other, hydraulically operated means for forcibly moving the second arms of said operating levers in direction away from each other thus to move the first arms of said operating levers toward each other, equalizing levers assembled with the second arms of said operating levers, and devices adapted selectively to be assembled with said equalizing levers to cause said second arms of the operating levers to be movable in equal degree and to equal extent or released from the equalizing levers to permit the second arms of said operating levers to be free for movement independently of each other.

10. In a machine of the character described, a pushrod mounted for longitudinal sliding movement, a clamping member upon one end of said pushrod, an adjuster nut having its shank slidably disposed in an end portion of said pushrod opposite said clamping member and its head situated to be capable of engaging the adjacent end of the pushrod, a connector shaft situated interiorly of said pushrod having one of its end portions slidably supported in said clamping member and its other end portion threadably received in the shank of said adjuster nut, a supporting head fixed to an end of said connector shaft and disposed exteriorly of said pushrod at the side of said clamping member opposite said adjuster nut, and resilient means urging said connector shaft, together with said adjuster nut and said supporting head as a unit, longitudinally of said pushrod in direction to cause said supporting head to be moved toward said clamping member.

11. The combination as specified in claim 10, an adapter capable of detachable assembly with said supporting head, and an adapter element upon said adapter at the side thereof opposite the supporting head.

12. In a machine for centering and alining with respect to each other a connecting rod bearing to be rebored and a boring bar with appropriate tool for reboring said bearing, a frame, a first supporting unit on said frame including portions for removably receiving a first locating element for insertion through a bearing of said connecting rod other than a bearing to be rebored, spaced apart, second and third supporting units on said frame, alined bearings upon said second and third supporting unit, respectively, parallel to said first supporting unit portions and adapted selectively to removably receive a second locating element or a boring bar for insertion through a bearing to be rebored of said connecting rod while situated between said second and third supporting units, means for accomplishing adjustment of said first supporting unit portions toward and away from said alined bearings, spaced apart clamping units at opposite sides of said second locating element and between said second and third supporting units in spaced relation to said first supporting unit, devices slidably mounting said clamping units on said frame for movement toward and away from each other, power actuated means for moving said clamping units simultaneously into engaged relation with and away from oppositely disposed surfaces of said connecting rod in spaced relation to said first locating element and at opposite sides of said second locating element, each of said clamping units including a hollow pushrod and a tubular element, and means for accomplishing relative longitudinal adjustment of the hollow pushrod and tubular element of each of said clamping units independently.

13. In a machine of the character described, a frame, alined tubular elements mounted on said frame for movement toward and away from each other, alined pushrods mounted in said tubular elements for longitudinal sliding movement, spaced apart clamping members supported upon and between said pushrods in alined relation therewith, and means for accomplishing relative longitudinal adjustment of each tubular element and the pushrod mounted therein thus to accomplish adjustment of said clamping members toward and away from each other.

14. In a machine for centering and alining with respect to each other a connecting rod bearing to be rebored and a boring bar with appropriate tool for reboring said bearing, a frame, a first supporting unit on said frame including portions for removably receiving a first locating element for insertion through a bearing of said connecting rod other than a bearing to be rebored, spaced apart, second and third supporting units on said frame, alined bearings upon said second and third supporting units, respectively, adapted selectively to removably receive a second locating element or a boring bar for insertion through a bearing to be rebored of said connecting rod while situated between said second and third supporting units, spaced apart clamping units at opposite sides of said second locating element and between said second and third supporting units mounted for movement toward and away from each other, means for actuating said clamping units simultaneously into releasably engaged relation with oppositely disposed surfaces of said connecting rod at opposite sides of said second locating element and in spaced relation to said first locating element while the connecting rod is supported upon the first locating element and situated upon the second locating element, each of said clamping units including a pushrod mounted for independent longitudinal movement, and means for independently adjusting said pushrods relative to said frame toward and away from each other.

15. In a machine for centering and alining with respect to each other a connecting rod bearing to be rebored and a boring bar with appropriate tool for reboring said bearing, a frame, a first supporting unit on said frame including portions for removably receiving a first locating element for insertion through a bearing of said connecting rod other than a bearing to be rebored, spaced apart, second and third supporting units on said frame, alined bearings upon said second and third supporting units, respectively, parallel to and in the plane of said first supporting unit portions adapted selectively to removably receive a second locating element or a boring bar for insertion through a bearing to be rebored of said connecting rod while situated between said second and third supporting units, means mounting said first supporting unit portions for adjustment toward and away from said alined bearings, spaced apart clamping units at opposite sides of said second locating elements and between said second and third supporting units in spaced relation to said first supporting unit mounted for movement toward and away from each other, power actuated means for moving said clamping units simultaneously into releasably engaged relation with surfaces of said connecting rod in spaced relation to said first locating element and at opposite sides of said second locating element, each of said clamping units including a pushrod mounted for independent longitudinal movement, a tubular element in which said pushrod is longitudinally movable, a clamping element upon said pushrod, and means for accomplishing relative longitudinal adjustment of said tubular element and pushrod thus to accomplish adjustment of the clamping members of the different clamping units toward and away from each other.

EWALD A. ARP.

REFERENCES CITED

The following references are of record in the file of this patent:

UNITED STATES PATENTS

| Number | Name | Date |
|---|---|---|
| 1,497,904 | Harrington | June 17, 1924 |
| 1,622,560 | Aab | Mar. 29, 1927 |
| 2,031,173 | Miller | Feb. 18, 1936 |